(12) United States Patent
Liu et al.

(10) Patent No.: US 11,024,057 B2
(45) Date of Patent: Jun. 1, 2021

(54) CALIBRATION SYSTEM AND METHOD FOR PANORAMIC PHOTOGRAPHING DEVICE PARAMETER

(71) Applicant: SHENZHEN PISOFTWARE TECHNOLOGY CO. LTD., Shenzhen (CN)

(72) Inventors: Yahui Liu, Shenzhen (CN); Jingcheng Shen, Shenzhen (CN); Shibo Wang, Shenzhen (CN); Chao Wang, Shenzhen (CN)

(73) Assignee: SHENZHEN PISOFTWARE TECHNOLOGY CO., LTD., Shenzhen (CN)

( * ) Notice: Subject to any disclaimer, the term of this patent is extended or adjusted under 35 U.S.C. 154(b) by 262 days.

(21) Appl. No.: 16/305,766

(22) PCT Filed: Mar. 31, 2017

(86) PCT No.: PCT/CN2017/079094
§ 371 (c)(1),
(2) Date: Nov. 29, 2018

(87) PCT Pub. No.: WO2017/181839
PCT Pub. Date: Oct. 26, 2017

(65) Prior Publication Data
US 2020/0327697 A1    Oct. 15, 2020

(30) Foreign Application Priority Data
Apr. 21, 2016    (CN) .......................... 201610249486.1

(51) Int. Cl.
*G06T 7/80*     (2017.01)
*G06T 7/33*     (2017.01)
*H04N 5/232*    (2006.01)

(52) U.S. Cl.
CPC .................. *G06T 7/85* (2017.01); *G06T 7/33* (2017.01); *H04N 5/23238* (2013.01); *G06T 2207/10021* (2013.01); *G06T 2207/30244* (2013.01)

(58) Field of Classification Search
CPC ... G06T 7/85; G06T 7/33; G06T 2207/30244; G06T 2207/10021; H04N 5/23238
See application file for complete search history.

(56) References Cited

U.S. PATENT DOCUMENTS

2014/0347439 A1    11/2014    Jia et al.
2016/0104285 A1*   4/2016     Pettegrew ................. G06T 5/50
                                                              348/36

FOREIGN PATENT DOCUMENTS

CN    101866482 A    10/2010
CN    102289145 A    12/2011
(Continued)

OTHER PUBLICATIONS

International Search Report dated May 31, 2017 for corresponding International Application No. PCT/CN2017/079094, filed Mar. 31, 2017.
(Continued)

*Primary Examiner* — Nam D Pham
(74) *Attorney, Agent, or Firm* — Steven M. Koehler; Westman, Champlin & Koehler, P.A.

(57) ABSTRACT

A calibration system and a method for panoramic photographing device parameter, including: an image acquisition module, a parameter solver module connected with the image acquisition module, and a data analysis module connected with the parameter computation module; the image acquisition module is configured to send an instruction to cause N cameras of the panoramic photographing device to acquire and store M sets of images synchronously and consecutively; the parameter solver module configured (Continued)

to sequentially read out the M sets of images from the image acquisition module, and to separately process the M sets of images, and to acquire M corresponding device parameters for storage and delivery; and the data analysis module configured to receive the M corresponding device parameters sent by the parameter solver module, and to perform data analysis to the M corresponding device parameters, and to acquire and store an optimal solution of the calibration parameters.

10 Claims, 2 Drawing Sheets

(56) References Cited

FOREIGN PATENT DOCUMENTS

| | | |
|---|---|---|
| CN | 103118230 A | 5/2013 |
| CN | 104184961 A | 12/2014 |
| CN | 104284093 A | 1/2015 |
| CN | 104869313 A | 8/2015 |

OTHER PUBLICATIONS

Written Opinion of the International Searching Authority dated May 31, 2017 for corresponding International Application No. PCT/CN2017/079094, filed Mar. 31, 2017.

* cited by examiner

CALIBRATION SYSTEM AND METHOD FOR PANORAMIC PHOTOGRAPHING DEVICE PARAMETER

CROSS-REFERENCE TO RELATED APPLICATION

This application is the International Application No. PCT/CN2017/079094 for entry into US national phase, with an international filing date of Mar. 31, 2017 designating the U.S. and claims priority benefits to Chinese Patent Application No. 201610249486.1, filed on Apr. 21, 2016, the contents of which being incorporated herein by reference.

TECHNICAL FIELD

The present application relates to the field of panoramic photography technology, and more particularly to a calibration system and a method for panoramic photographing device parameter.

BACKGROUND

At present, the more typical panoramic imaging method is to use a plurality of cameras combination to shoot and then image sequence of each of the cameras at the same time is spliced to acquire a panoramic image. The existing panoramic image splicing technology is mainly divided into two categories: a first category is calculating the projection transformation relationship of adjacent images according to the corresponding point pairs of adjacent images in the image sequence; thereby the image sequence is transformed and superimposed to acquire a panoramic image. A second category is calculating the coordinate mapping relationship between each pixel in the image sequence and each pixel of the panoramic image according to the pre-calibrated device parameter; thereby the image sequence is transformed into the panoramic image. The advantage of the above first category method is that pre-calibration of device parameters is not required and the image transformation relationship can be automatically calculated according to the feature point pairs in the image to acquire a panoramic image; and the disadvantage is that the accuracy depends on the extraction accuracy of the feature point pairs, a large amount of calculation is needed, and real-time splicing cannot be achieved. The advantage of the second category method is that the mapping relationship of the pixel coordinates can be quickly calculated according to the pre-calibrated device parameters, and the panoramic image is directly acquired without complicated calculation; and the disadvantage is: Firstly, the existing calibration method is cumbersome and usually a expensive calibration devices are required; secondly, the fixed device parameters cannot adapt to complex scene changes, which will lead to errors such as splicing seams; finally, if the positions of each camera relative to each other are changed due to external forces during the device in actual use, which will lead to pre-calibrated parameters invalid.

SUMMARY

In summary, in order to solve the above technical problems, the present application provides a calibration system and a method for panoramic photographing device parameter to simplify the operation process of parameter calibration and reduce the dependence on the calibration device.

In a first aspect, the present application provides a calibration system for panoramic photographing device parameter, including:

an image acquisition module, configured to send an instruction to cause N cameras of the panoramic photographing device to acquire and store M sets of images synchronously and consecutively;

a parameter solver module, configured to sequentially read out the M sets of images from the image acquisition module, and to separately process the M sets of images, and to acquire M corresponding device parameters for storage and delivery, the parameter solver module is connected with the image acquisition module; and a data analysis module, configured to receive the M corresponding device parameters sent by the parameter solver module, and to perform data analysis to the M corresponding device parameters, and to acquire an optimal solution of the calibration parameters and store the same, the data analysis module is connected with the parameter solver module.

Further, the image acquisition module includes an image sequence data unit, and the image sequence data unit is composed of M sets of sequentially arranged image sequences.

Further, the parameter solver module includes:

an image pair storage unit, configured to sequentially read out a set of image sequences from the image sequence data unit, and to store adjacent images in the set of image sequences in the form of image pair to acquire N image pairs, in which the image pair storage unit is connected with the image sequence data unit;

a feature point pair extraction function unit, configured to read out the image pair from the image pair storage unit, and to extract and send a corresponding feature point pair coordinate according to the image pair, in which the feature point pair extraction function unit is connected with the image pair storage unit;

a feature point pair coordinate storage unit, configured to receive feature point pair coordinates sent by the feature point pair extraction function unit, and to store the feature point pair coordinate in a form of point pair list, in which the feature point pair coordinate storage unit is connected with the feature point pair extraction function unit a parameter solver function unit, configured to extract and process a point pair list in the feature point pair coordinate storage unit, and to calculate an internal and external parameter of the N cameras and send the same, in which the parameter solver function unit is connected with the feature point pair coordinate storage unit; and a device parameter storage unit, configured to receive the internal parameter and external parameter of the N cameras sent by the parameter solver function unit, and to store the internal parameter and external parameter of the N cameras in a form of parameter table, in which the device parameter storage unit is connected with the parameter solver function unit.

Further, the data analysis module includes:

a training data unit, configured to sequentially extract the parameter table from the device parameter storage unit, and to sequentially arrange and send the parameter table into Training data with M rows and N columns, in which the training data unit is connected with the device parameter storage unit;

a parameter optimization function unit, configured to receive the training data sent by the training data unit, and to perform data analysis to the training data to acquire and send an optimal solution of the calibration parameter, in which the parameter optimization function unit is connected with the training data unit; and a calibration result storage unit, configured to receive and store the optimal solution of the calibration parameter sent by the parameter optimization function unit, in which the calibration result storage unit is connected with the parameter optimization function unit.

In a second aspect, the present application provides a calibration method for a panoramic photographing device parameter, including the following steps:

step A, sending an instruction to acquire and store M sets of images synchronously and consecutively via N cameras of the panoramic photographing device;

step B, sequentially reading out the M sets of images in step A, and respectively processing the M sets of images in step A to acquire and store M corresponding device parameters;

step C, performing data analysis to the M corresponding device parameters in step B to acquire and store an optimal solution of the calibration parameter.

Further, between step B and step C further includes the following step:

step D: determining whether reading of the M sets of image sequences is completed; and executing step C if the reading is completed; otherwise, returning to step B.

Further, step A includes the following step:

step A1, sequentially arranging the M sets of images into M sets of image sequences.

Further, step B includes the following steps:

step B1, sequentially reading out a set of image sequences in step A1, and storing adjacent images in the set of image sequences in a form of image pair to acquire N image pairs;

step B2, reading out the image pairs in step B1, and extracting corresponding feature point pair coordinates according to the image pairs in step B1;

step B3, storing the feature point pair coordinates in step B2 in a form of point pair list;

step B4, extracting and processing the point pair list in step B3, and calculating internal parameter and external parameter of the N cameras;

step B5, storing the internal parameter and external parameter of the N cameras in step B4 in a form of parameter table.

Further, step C includes the following steps:

step C1, sequentially extracting the parameter table in step B5, and sequentially arranging the parameter table into training data with M rows and N columns;

step C2, performing data analysis to the training data in step C1 to acquire an optimal solution of the calibration parameters;

step C3, storing the optimal solution of the calibration parameters in step C2. Further, between step B5 and step C1 further includes the following step:

step D1, determining whether reading of the M sets of image sequences is completed; and executing step C1 if the reading is completed; otherwise, returning to step B1.

Compared with the prior art, the present application can realize the full-automatic calibration of the panoramic photographing device parameter, the operation procedure of the parameter calibration can be greatly simplified, and the dependence on the calibration device can be reduced, and it is great significance for enhancing the flexibility and robustness of the device, and improving the accuracy of panoramic splicing.

DETAILED DESCRIPTION OF THE EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

The implementation of the present application will be described in detail below with reference to specific embodiments.

Figure 1:
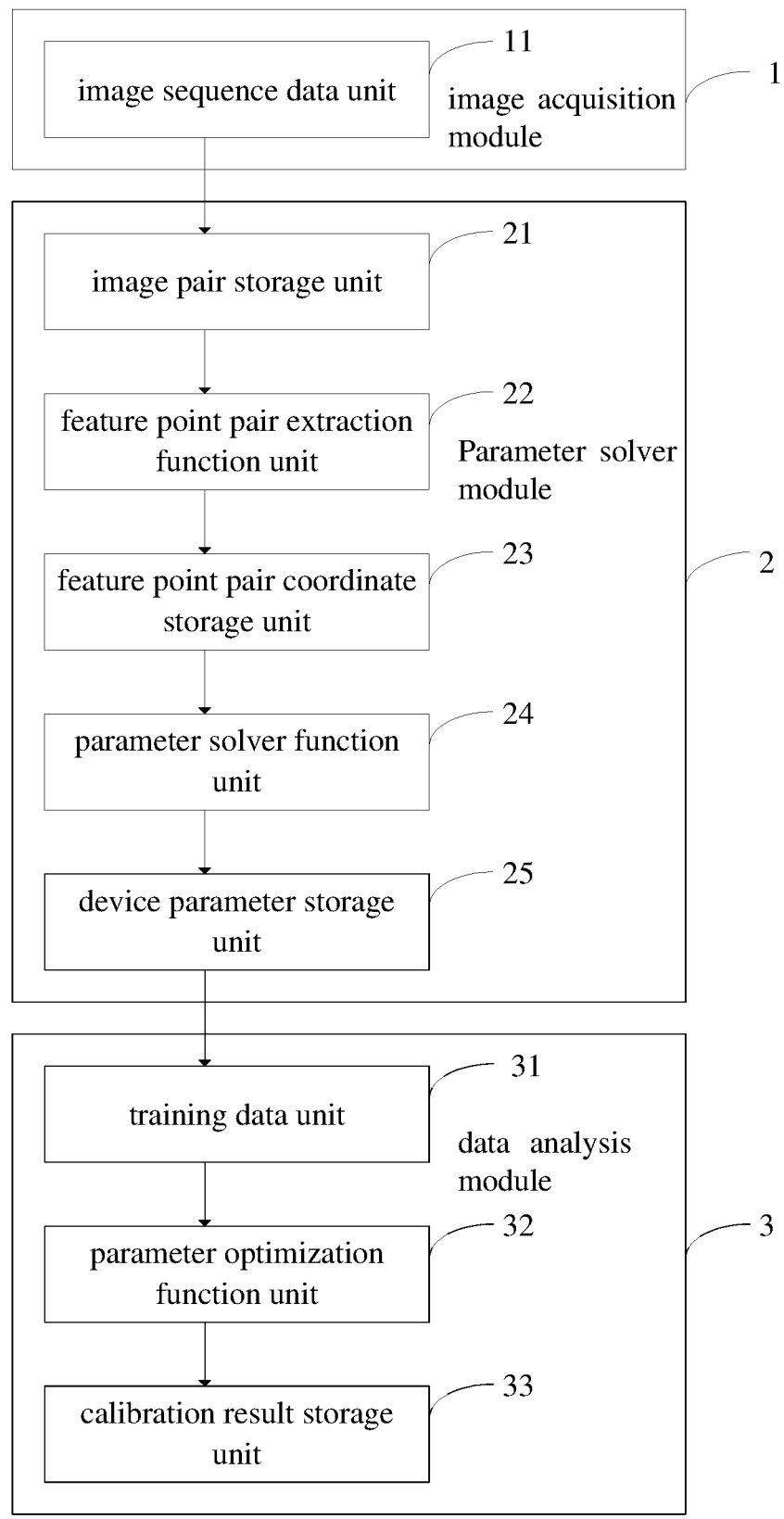
FIG. 1 is a schematic structural diagram of a calibration system for panoramic photographing device parameter according to an embodiment of the present application.

Please refer to FIG. 1. FIG. 1 is a schematic structural diagram of a calibration system for a panoramic photographing device parameter according to an embodiment of the present application. As shown in FIG. 1, the calibration system for a panoramic photographing device parameter includes: an image acquisition module 1, a parameter solver module 2, and a data analysis module 3; an output end of the image acquisition module 1 is connected with an input end of the parameter solver module 2, and an output end of the parameter solver module 2 is connected with an input end of the data analysis module 3;

the image acquisition module 1, configured to send an instruction to cause N cameras of the panoramic photographing device to acquire and store M sets of images synchronously and consecutively;

the parameter solver module 2, configured to sequentially read out the M sets of images from the image acquisition module 1, and to separately process the M sets of images, and to acquire M corresponding device parameters for storage and delivery;

the data analysis module 3, configured to receive the M corresponding device parameters sent by the parameter solver module 2, and to perform data analysis to the M corresponding device parameters, and to acquire and store an optimal solution of the calibration parameters.

In the embodiment of the present application, the image acquisition module 1 is provided with an image sequence data unit 11, and the image sequence data unit 11 is composed of M sets of sequentially arranged image sequences;

The parameter solver module 2 is provided with an image pair storage unit 21, a feature point pair extraction function unit 22, a feature point pair coordinate storage unit 23, a parameter solver function unit 24, and a device parameter storage unit 25;

an input end of the image pair storage unit 21 is connected with an output end of the image sequence data unit 11, and an input end of the feature point pair extraction function unit 22 is connected with an output end of the image pair storage unit 21, and an input end of the feature point pair coordinate storage unit 23 is connected with an output end of the feature point pair extracting function unit 22, an input end of the parameter solver function unit 24 is connected with an output end of the feature point pair coordinate storage unit 23, and an input end of the device parameter storage unit 25 is connected with an output end of the parameter solver function unit 24;

the image pair storage unit 21, configured to sequentially read out a set of image sequences from the image sequence data unit 11, and to store adjacent images in the set of image sequences in the form of image pair to acquire N image pairs;

the feature point pair extraction function unit 22, configured to read out the image pair from the image pair storage unit 21, and to extract and send a corresponding feature point pair coordinate according to the image pair;

the feature point pair coordinate storage unit 23, configured to receive feature point pair coordinates sent by the feature point pair extraction function unit 22, and to store the feature point pair coordinate in a form of point pair list;

the parameter solver function unit 24, configured to extract and process a point pair list in the feature point pair coordinate storage unit 23, and to calculate and send an internal and external parameter of the N cameras;

the device parameter storage unit 25, configured to receive the internal parameter and external parameter of the N cameras sent by the parameter solver function unit 24, and to store the internal parameter and external parameter of the N cameras in a form of parameter table.

The data analysis module 3 is provided with a training data unit 31, a parameter optimization function unit 32, and a calibration result storage unit 33;

an input of the training data unit 31 is connected with an output of the device parameter storage unit 25, an input of the parameter optimization function unit 32 is connected with an output of the training data unit 31, and an input of the calibration result storage unit 33 is connected with an output of the parameter optimization function unit 32;

the training data unit 31, configured to sequentially extract the parameter table from the device parameter storage unit 25, and to sequentially arrange and send the parameter table into the training data with M rows and N columns;

the parameter optimization function unit 32, configured to receive the training data sent by the training data unit 31, to perform data analysis to the training data to acquire and send an optimal solution of the calibration parameter;

the calibration result storage unit 33, configured to receive and store the optimal solution of the calibration parameter sent by the parameter optimization function unit 32.

Figure 2:
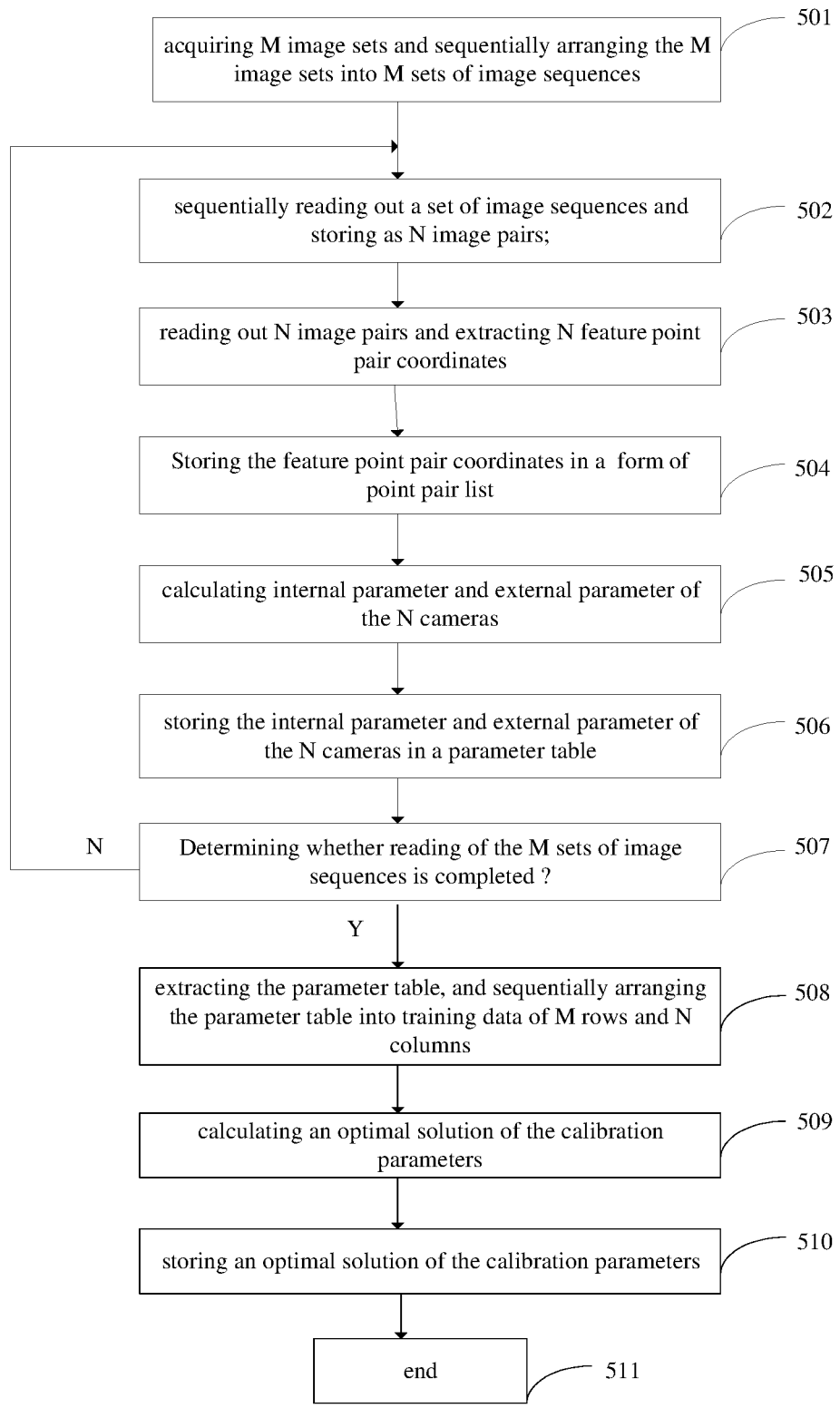
FIG. 2 is a schematic flowchart diagram of a calibration system for panoramic photographing device parameter according to an embodiment of the present application.

Please refer to FIG. 2, FIG. 2 is a schematic flowchart diagram of a calibration system for panoramic photographing device parameter according to an embodiment of the present application. As shown in FIG. 2, the calibration method for a panoramic photographing device parameter includes the following steps:

step 501: controlling N cameras of the panoramic photographing device to acquire M sets of images synchronously and consecutively, and sequentially arranging and storing the M sets of images into M sets of image sequences;

step 502: sequentially reading out a set of image sequences, and storing adjacent images in the set of image sequences in a mage pair form to acquire N image pairs;

step 503: reading out an image pair, and extracting corresponding feature point pair coordinates according to the image pair;

step 504: storing the feature point pair coordinates in a form of point pair list;

step 505: extracting and processing the point pair list, and calculating internal parameter and external parameter of the N cameras;

step 506: storing the internal parameter and external parameter of the N cameras in a form of parameter table;

step 507: determining whether reading of the M sets of image sequences is completed; and executing step 508 if the reading is completed; otherwise, returning to step 502;

step 508: sequentially extracting the parameter table, and sequentially arranging the parameter table into training data with M rows and N columns;

step 509: performing data analysis to the training data to acquire an optimal solution of the calibration parameters;

step 510: storing an optimal solution of the calibration parameters;

step 511: end.

The present application can realize the full-automatic calibration of the panoramic photographing device parameter, the operation procedure of the parameter calibration can be greatly simplified, and the dependence on the calibration device can be reduced, and it is great significance for enhancing the flexibility and robustness of the device, and improving the accuracy of panoramic splicing.

The aforementioned embodiments are only preferred embodiments of the present application, and should not be regarded as being limitation to the present application. Any modification, equivalent replacement, improvement, and so on, which are made within the spirit and the principle of the present application, should be included in the protection scope of the present application.

What is claimed is:

1. A calibration system for panoramic photographing device parameter, comprising:
   an image acquisition module, configured to send an instruction to cause N cameras of the panoramic photographing device to acquire and store M sets of images synchronously and consecutively;
   a parameter solver module, configured to sequentially read out the M sets of images from the image acquisition module, and to process the M sets of images respectively, and to acquire M corresponding device parameters for storage and delivery, wherein the parameter solver module is connected with the image acquisition module; and
   a data analysis module, configured to receive the M corresponding device parameters sent by the parameter solver module, and to perform data analysis to the M corresponding device parameters, and to acquire and store an optimal solution of calibration parameters, wherein the data analysis module is connected with the parameter solver module.

2. The calibration system of claim 1, wherein the image acquisition module comprises an image sequence data unit, and the image sequence data unit is composed of M sets of sequentially arranged image sequences.

3. The calibration system of claim 2, wherein the parameter solver module comprises:
   an image pair storage unit, configured to sequentially read out a set of image sequences from the image sequence data unit, and to store adjacent images in the set of image sequences in the form of image pair to acquire N image pairs, wherein the image pair storage unit is connected with the image sequence data unit;
   a feature point pair extraction function unit, configured to read out the image pair from the image pair storage unit, and to extract and send a corresponding feature point pair coordinate according to the image pair, the feature point pair extraction function unit is connected with the image pair storage unit;
   a feature point pair coordinate storage unit, configured to receive feature point pair coordinates sent by the feature point pair extraction function unit, and to store the feature point pair coordinate in a form of point pair list, wherein the feature point pair coordinate storage unit is connected with the feature point pair extraction function unit a parameter solver function unit, configured to extract and process the point pair list in the feature point pair coordinate storage unit, and to calculate and send an internal parameter and an external parameter of the N cameras, wherein the parameter solver function unit is connected with the feature point pair coordinate storage unit; and a device parameter storage unit, configured to receive the internal parameter and external parameter of the N cameras sent by the parameter solver function unit, and to store the internal parameter and external parameter of the N cameras in a form of parameter table, wherein the device parameter storage unit is connected with the parameter solver function unit.

4. The calibration system of claim 3, wherein the data analysis module comprises:

a training data unit, configured to sequentially extract the parameter table from the device parameter storage unit, and to sequentially arrange and send the parameter table into Training data with M rows and N columns, wherein the training data unit is connected with the device parameter storage unit;

a parameter optimization function unit, configured to receive the training data sent by the training data unit, and to perform data analysis to the training data to acquire and send the optimal solution of the calibration parameters, wherein the parameter optimization function unit is connected with the training data unit; and a calibration result storage unit, configured to receive and store the optimal solution of the calibration parameters sent by the parameter optimization function unit, wherein the calibration result storage unit is connected with the parameter optimization function unit.

5. A calibration method for panoramic photographing device parameter, comprising the following steps:

step A, sending an instruction to acquire and store M sets of images synchronously and consecutively via N cameras of the panoramic photographing device;

step B, sequentially reading out the M sets of images in step A, and respectively processing the M sets of images in step A to acquire and store M corresponding device parameters;

step C, performing data analysis to the M corresponding device parameters in step B to acquire and store an optimal solution of calibration parameters.

6. The calibration method of claim 5, wherein between step B and step C further comprising the following step:

step D: determining whether reading of the M sets of image sequences is completed; and executing step C if the reading is completed; otherwise, returning to step B.

7. The calibration method of claim 5, wherein step A comprises the following step:

step A1, sequentially arranging the M sets of images into M sets of image sequences.

8. The calibration method of claim 7, wherein step B comprising the following steps:

step B1, sequentially reading out a set of image sequences in step A1, and storing adjacent images in the set of image sequences in a form of image pair to acquire N image pairs;

step B2, reading out the image pairs in step B1, and extracting corresponding feature point pair coordinates according to the image pairs in step B1;

step B3, storing the feature point pair coordinates in step B2 in a form of point pair list;

step B4, extracting and processing the point pair list in step B3, and calculating internal parameter and external parameter of the N cameras;

step B5, storing the internal parameter and external parameter of the N cameras in step B4 in a form of parameter table.

9. The calibration method of claim 8, wherein step C comprises the following steps:

step C1, sequentially extracting the parameter table in step B5, and sequentially arranging the parameter table into training data with M rows and N columns;

step C2, performing data analysis to the training data in step C1 to acquire the optimal solution of the calibration parameters;

step C3, storing the optimal solution of the calibration parameters in step C2.

10. The calibration method of claim 9, wherein between step B5 and step C1 further comprising the following step:

step D1, determining whether reading of the M sets of image sequences is completed; and executing step C1 if the reading is completed; otherwise, returning to step B1.

* * * * *